US006763244B2

(12) United States Patent
Chen et al.

(10) Patent No.: US 6,763,244 B2
(45) Date of Patent: Jul. 13, 2004

(54) METHOD AND APPARATUS FOR ADJUSTING POWER CONTROL SETPOINT IN A WIRELESS COMMUNICATION SYSTEM

(75) Inventors: Tao Chen, San Diego, CA (US); Jack M. Holtzman, San Diego, CA (US); Fuyun Ling, San Diego, CA (US); Keith Saints, San Diego, CA (US); Nagabhushana Sindhushayana, San Diego, CA (US); Charles E. Wheatley, III, Del Mar, CA (US)

(73) Assignee: Qualcomm Incorporated, San Diego, CA (US)

( * ) Notice: Subject to any disclaimer, the term of this patent is extended or adjusted under 35 U.S.C. 154(b) by 464 days.

(21) Appl. No.: 09/810,685

(22) Filed: Mar. 15, 2001

(65) Prior Publication Data

US 2002/0165004 A1 Nov. 7, 2002

(51) Int. Cl.[7] .................................................. H04B 1/16

(52) U.S. Cl. ...................... 455/522; 455/67.11; 375/317

(58) Field of Search ........................ 455/522, 69, 67.11, 455/115.1; 375/316, 317, 147

(56) References Cited

U.S. PATENT DOCUMENTS

| 5,056,109 A | 10/1991 | Gilhousen et al. |
| 5,265,119 A | 11/1993 | Gilhousen et al. |
| 5,710,784 A | 1/1998 | Kindred et al. |
| 5,751,725 A | 5/1998 | Chen |
| 5,903,554 A | 5/1999 | Saints |
| 6,175,590 B1 | 1/2001 | Stein |

FOREIGN PATENT DOCUMENTS

| GB | 2351420 A | 12/2000 |
| JP | 1146758 A1 | 10/2001 |
| WO | 00/35120 | 6/2000 |
| WO | 00/45528 | 8/2000 |
| WO | WO 200101600 A1 * | 1/2001 | ........... H04B/7/005 |

OTHER PUBLICATIONS

Andrew J. Viterbi, "Convolutional Codes and Their Performance in Communication Systems," IEEE Transactions on Communications Technology, vol. COM–19, No. 5, Oct. 1971 (pp. 751–772).
Shu Lin, et al. "Error Control Coding" *Fundamentals and Applications*; Prentice–Hall, Inc. Englewood Cliffs, New Jersey 07632 (pp. 170–176).
U.S. application Ser. No. 09/239,454, entitled "Method and Apparatus for Controlling Transmission Power in a Potentially Transmission Gated or Capped Communication System," filed Jan. 28, 1999. Tao Chen, et al., QUALCOMM Inc., San Diego, California (USA).

(List continued on next page.)

*Primary Examiner*—Nay Maung
*Assistant Examiner*—Philip J. Sobutka
(74) *Attorney, Agent, or Firm*—Philip R. Wadsworth; Thien T. Nguyen; S. Hossain Beladi

(57) ABSTRACT

Techniques to adjust the setpoint of a power control loop in a wireless communication system. The setpoint may be adjusted based on frame status indicative of erased/good decoded frames, one or more (typically soft) metrics indicative of the confidence in the decoded results, power surplus/deficit indicative of the difference between the received signal quality and the setpoint, setpoint surplus/deficit indicative of the difference between the setpoint and a threshold $E_b/N_t$ needed for the desired level of performance, or a combination thereof. The metrics may include re-encoded symbol error rate, re-encoded power metric, modified Yamamoto metric, minimum or average LLR among decoded bits, number of decoding iterations, and possibly others. The setpoint may be adjusted in different manners and/or by different amounts depending on the above-noted factors. The techniques may be employed for forward and/or reverse links in CDMA systems.

27 Claims, 9 Drawing Sheets

OTHER PUBLICATIONS

U.S. application Ser. No. 09/755,659, entitled "Method and Apparatus for Power Control of Multiple Channels in a Wireless Communication System," filed Jan. 5, 2001. Tao Chen, et al., QUALCOMM Inc., San Diego, California (USA).

U.S. application Ser. No. 09/755,245, entitled "Method and Apparatus for Determining the Forward Link Closed Loop Power Control Set Point in a Wireless Packet Data Communication System," filed Jan. 5, 2001. Tao Chen, et al., QUALCOMM Inc., San Diego, California (USA).

U.S. application Ser. No. 09/370,081, entitled "Method and Apparatus for Determining the Closed Loop Power Control Set Point in a Wireless Packet Data Communication System," filed Aug. 5, 1999. Peter J. Black, et al., QUALCOMM Inc., San Diego, California (USA).

H.W. Seok et al. "Capacity Enhancement by Using Optimum Step Sizes of Controlling Target SIR in a CDMA System" Vehicular Technology Conference, May 1998, pp. 1859–1863.

* cited by examiner

METHOD AND APPARATUS FOR ADJUSTING POWER CONTROL SETPOINT IN A WIRELESS COMMUNICATION SYSTEM

BACKGROUND

1. Field

The present invention relates generally to data communication, and more particularly to novel and improved techniques for adjusting a target received signal quality, or setpoint, for a power control loop in a wireless communication system.

2. Background

In a wireless communication system, a user with a remote terminal (e.g., a cellular phone) communicates with another user via transmissions on the forward and reverse links with one or more base stations. The forward link refers to transmission from the base station to the remote terminal, and the reverse link refers to transmission from the remote terminal to the base station. The forward and reverse links are typically allocated different frequency bands.

In a Code Division Multiple Access (CDMA) system, the total transmit power from a base station is typically indicative of the total capacity of the forward link since data may be transmitted to a number of users concurrently over a shared frequency band. A portion of the total transmit power may be allocated to each active user such that the total aggregate transmit power for all users is less than or equal to the total available transmit power.

To maximize the forward link capacity, the transmit power to each remote terminal may be controlled by a first power control loop such that the signal quality, as measured by the energy-per-bit-to-total-noise-plus-interference ratio ($E_b/N_t$), of a transmission received at the remote terminal is maintained at a particular target $E_b/N_t$. This target $E_b/N_t$ is often referred to as the power control setpoint (or simply, the setpoint). A second power control loop is typically employed to adjust the setpoint such that a desired level of performance, e.g., as measured by the frame error rate (FER), is maintained. The forward link power control mechanism thus attempts to reduce power consumption and interference while maintaining the desired link performance. This results in increased system capacity and reduced delays in serving users.

In a conventional implementation (e.g., as defined in the IS-95 standard), the setpoint is adjusted based on the status of received data frames (or packets). In one scheme, the setpoint is increased by a relatively large step (e.g., $\Delta U=1$ dB) whenever a frame erasure is detected (i.e., the frame is received in error). Conversely, the setpoint is decreased by a smaller step (e.g., $\Delta D=0.01$ dB) whenever a frame is properly decoded. For this scheme, the frame error rate is approximately equal to the ratio of the "down" step over the "up" step (i.e., $FER=\Delta D/(\Delta D+\Delta U)$).

The setpoint adjustment scheme described above results in a sawtooth response for the setpoint. This sawtooth response may result in transmission at higher power level than necessary since the setpoint can only be decreased in small steps. Moreover, accurate adjustment of the setpoint to reflect changing link condition is hindered by the fixed and small adjustment steps.

As can be seen, techniques that can be used to effectively adjust the setpoint of a power control loop, which may reduce transmit power consumption and interference and further increase system capacity, are highly desirable.

SUMMARY

The present invention provides power control techniques to effectively adjust the setpoint of a power control loop in a wireless communication system. The setpoint may be adjusted based on a set of factors, which may include the frame status indicative of whether or not a transmitted frame was received correctly. In one aspect, the setpoint is adjusted based, in part, on one or more (typically "soft" or multi-bit) metrics obtained for the received and decoded frame. Such metrics may provide information indicative of the link condition and may be advantageously used to more accurately adjust the setpoint. The setpoint may be adjusted in different manners and/or by different amounts depending on the metric values.

Various metrics may be used for link monitoring and setpoint adjustment. Generally, one or more metrics may be generated for any forward error correcting code (FEC) such as a convolutional code, a Turbo code, a block code, and others. These metrics may include a re-encoded symbol error rate (SER) and a re-encoded power metric (for all decoders), a "modified" Yamamoto metric (for a convolutional decoder), minimum or average (log) likelihood ratio (LLR) among bits in the decoded frame and number of iterations before declaring a decoded frame (for a Turbo decoder), and possibly others.

In another aspect, the setpoint may be adjusted based, in part, on the difference between the received signal quality and the setpoint (i.e., a power surplus or deficit). This allows the setpoint to be adjusted in a manner to account for the identified responsiveness of the power control mechanism to changing link condition (i.e., the ability of an inner power control loop to maintain the received signal quality at the setpoint). In yet another aspect, the setpoint may be adjusted based, in part, on the difference between the setpoint and a threshold $E_b/N_t$ needed for a desired level of performance (e.g., 1% FER).

The power control techniques described herein can be used for various wireless communication systems (e.g., cdma2000 and W-CDMA systems), and may be advantageously employed for the forward and/or reverse links. Various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
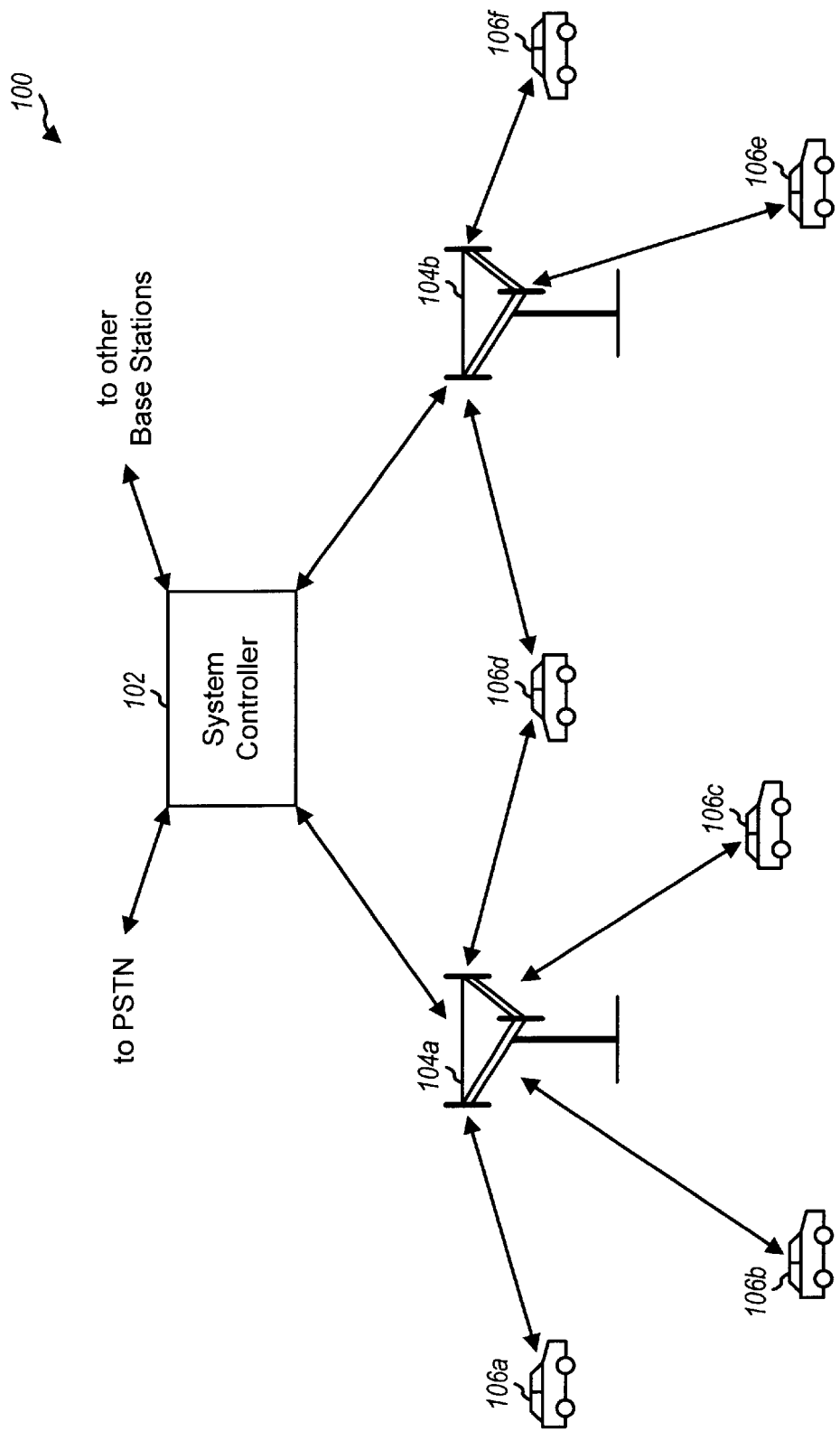
FIG. 1 is a diagram of a spread spectrum communication system that supports a number of users.

FIG. 1 is a diagram of a spread spectrum communication system 100 that supports a number of users. System 100 provides communication for a number of cells, with each cell being serviced by a corresponding base station 104. Various remote terminals 106 are dispersed throughout the system. Each remote terminal 106 may communicate with one or more base stations 104 on the forward and reverse links at any particular moment, depending on whether or not the remote terminal is active and whether or not it is in soft handoff. As shown in FIG. 1, base station 104a communicates with remote terminals 106a, 106b, 106c, and 106d, and base station 104b communicates with remote terminals 106d, 106e, and 106f.

In system 100, a system controller 102 couples to base stations 104 and may further couple to a public switched telephone network (PSTN). System controller 102 provides coordination and control for the base stations coupled to it. System controller 102 further controls the routing of telephone calls among remote terminals 106, and between remote terminals 106 and the users coupled to PSTN (e.g., conventional telephones), via base stations 104. System controller 102 is also referred to as a base station controller (BSC).

System 100 may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the "TIA/EIA-98-D Recommended Minimum Standard for Dual-Mode Wideband Spread Spectrum Cellular Mobile Station" (the IS-98 standard), (3) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (4) the standard offered by a consortium named "3rd Generation Partnership Project 2" (3GPP2) and embodied in a set of documents including Document Nos. C.S0002-A, C.S0005-A, C.S0010-A, C.S0011-A and C.S0026 (the cdma2000 standard), or some other standard. These standards are incorporated herein by reference.

Figure 2:
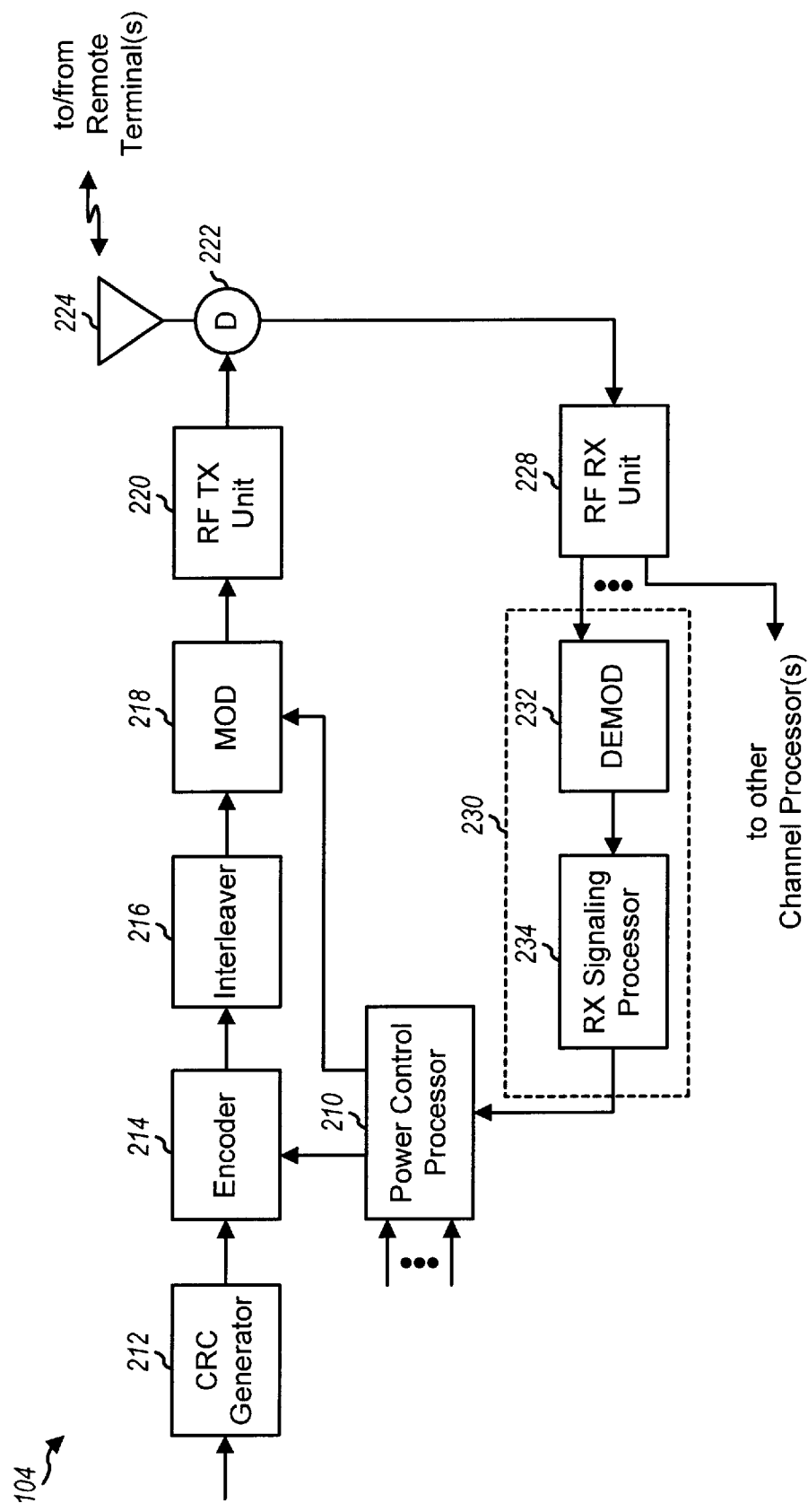
FIGS. 2 and 3 are block diagrams of an embodiment of a base station and a remote terminal, respectively, which are capable of implementing some aspects and embodiments of the invention.

FIG. 2 is a block diagram of an embodiment of base station 104, which is capable of implementing some aspects and embodiments of the invention. On the forward link, data is provided to a cyclic redundancy check (CRC) generator 212, which generates and appends a set of CRC bits for each frame (or packet) of data. CRC generator 212 may further format the frame into a particular format defined by the CDMA system. The formatted frame is then encoded by an encoder 214 with a particular coding scheme, which may include a convolutional code, a Turbo code, a block code, or a combination thereof. The encoded frame is interleaved (i.e., reordered) by interleaver 216 in accordance with a particular interleaving scheme also defined by the system.

The interleaved data is provided to a modulator (MOD) 218 and further processed (e.g., covered with a cover code, spread with short PN sequences, scrambled with a long PN sequence assigned to the recipient remote terminal, and so on). The modulated data is then provided to an RF TX unit 220 and conditioned (e.g., converted to one or more analog signals, amplified, filtered, quadrature modulated, and so on) to generate a forward link signal. The forward link signal is routed through a duplexer (D) 222 and transmitted via an antenna 224 to the remote terminal(s).

Although not shown in FIG. 2 for simplicity, base station 104 is capable of processing and transmitting data on one or more forward channels to a remote terminal. The processing (e.g., encoding, interleaving, covering, and so on) for each forward channel may be different from that of other forward channel(s).

Figure 3:
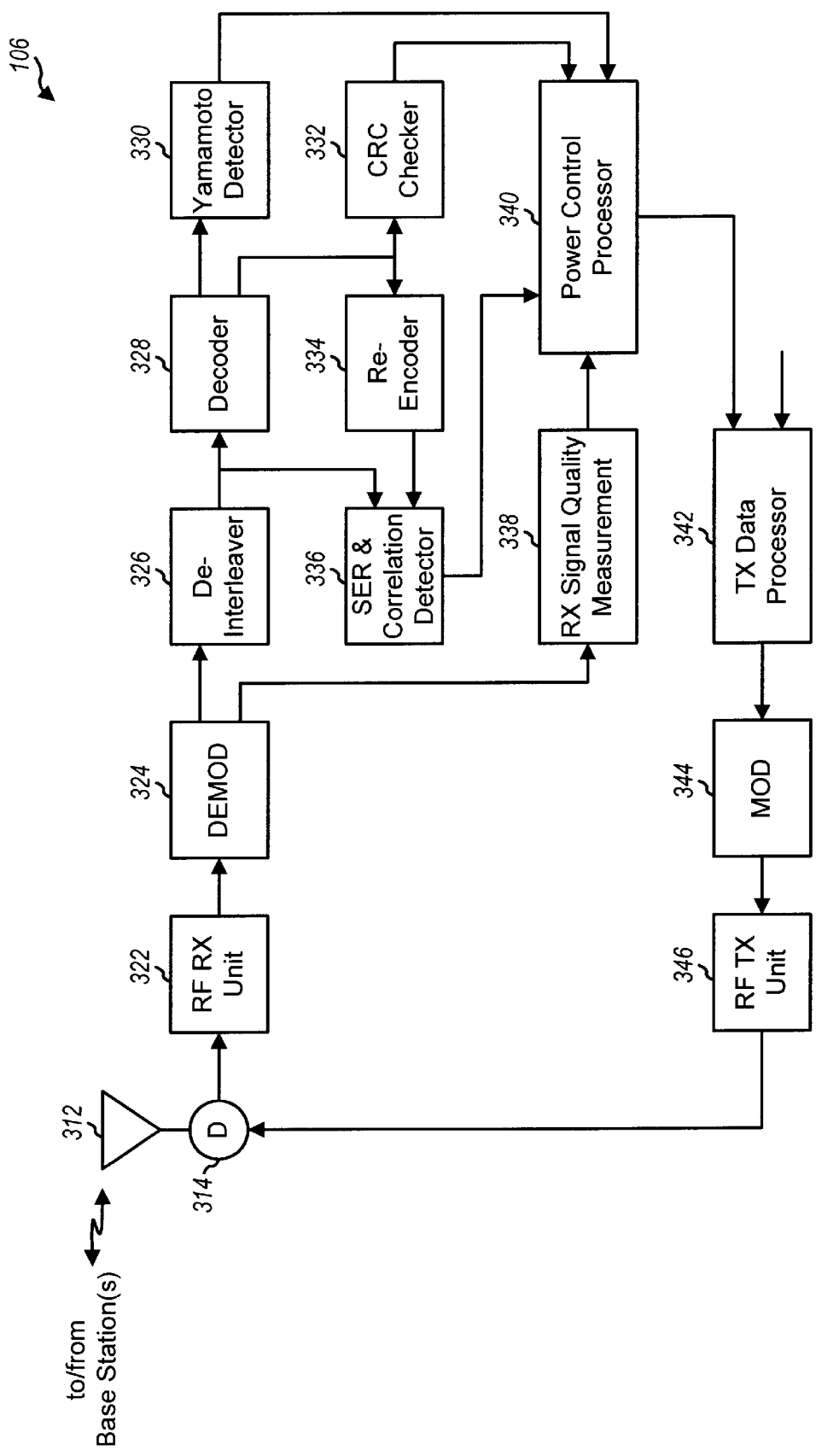

FIG. 3 is a block diagram of an embodiment of remote terminal 106, which is capable of implementing some aspects and embodiments of the invention. The forward link signal is received by an antenna 312, routed through a duplexer 314, and provided to an RF receiver unit 322. RF receiver unit 322 conditions (e.g., filters, amplifies, downconverts, and digitizes) the received signal and provides samples. A demodulator (DEMOD) 324 receives and processes (e.g., despreads, decovers, and pilot demodulates) the samples to provide recovered symbols. Demodulator 324 may implement a rake receiver that processes multiple instances of the received signal and generates combined recovered symbols. The recovered symbols are deinterleaved by a deinterleaver 326 in accordance with a deinterleaving scheme complementary to the interleaving scheme used at the base station.

A decoder 328 decodes the deinterleaved symbols in accordance with a decoding scheme complementary to the encoding scheme used at the base station. The decoded data for each frame is provided to a CRC checker 332, which determines whether the frame was decoded correctly or in error based on the appended CRC bits. For each received and decoded frame, CRC checker 332 provides a frame status indicative of whether the frame was erased or properly decoded.

As noted above, on the forward link, the capacity of each base station is limited by the total transmit power. To provide the desired level of performance and increase system capacity, the transmit power of each transmission from the base station may be controlled to be as low as possible to reduce power consumption while still maintaining the desired level of performance for the transmission. If the received signal quality at the remote terminal is too poor, the likelihood of correctly decoding the transmission decreases and performance may be compromised (e.g., a higher FER). Conversely, if the received signal quality is too high, the transmit power level is also likely to be too high and excessive amount of transmit power may have been unnecessarily used for the transmission, which reduces system capacity and may further cause extra interference to transmissions from other base stations.

On the reverse link, each transmitting remote terminal acts as interference to other active remote terminals in the system. The reverse link capacity is limited by the total interference that each remote terminal experiences from other transmitting remote terminals. To reduce interference and increase the reverse link capacity, the transmit power of each remote terminal is typically controlled to reduce interference to other transmitting remote terminals while still maintaining the desired level of performance.

The power control techniques of the invention can be used for various wireless communication systems, and may be advantageously employed for the forward and/or reverse links. For example, the power control techniques described herein may be used for CDMA systems that conform to the cdma2000 standard, the W-CDMA standard, some other standard, or a combination thereof. For clarity, various aspects and embodiments of the invention are described below for a specific implementation on the forward link.

Figure 4:
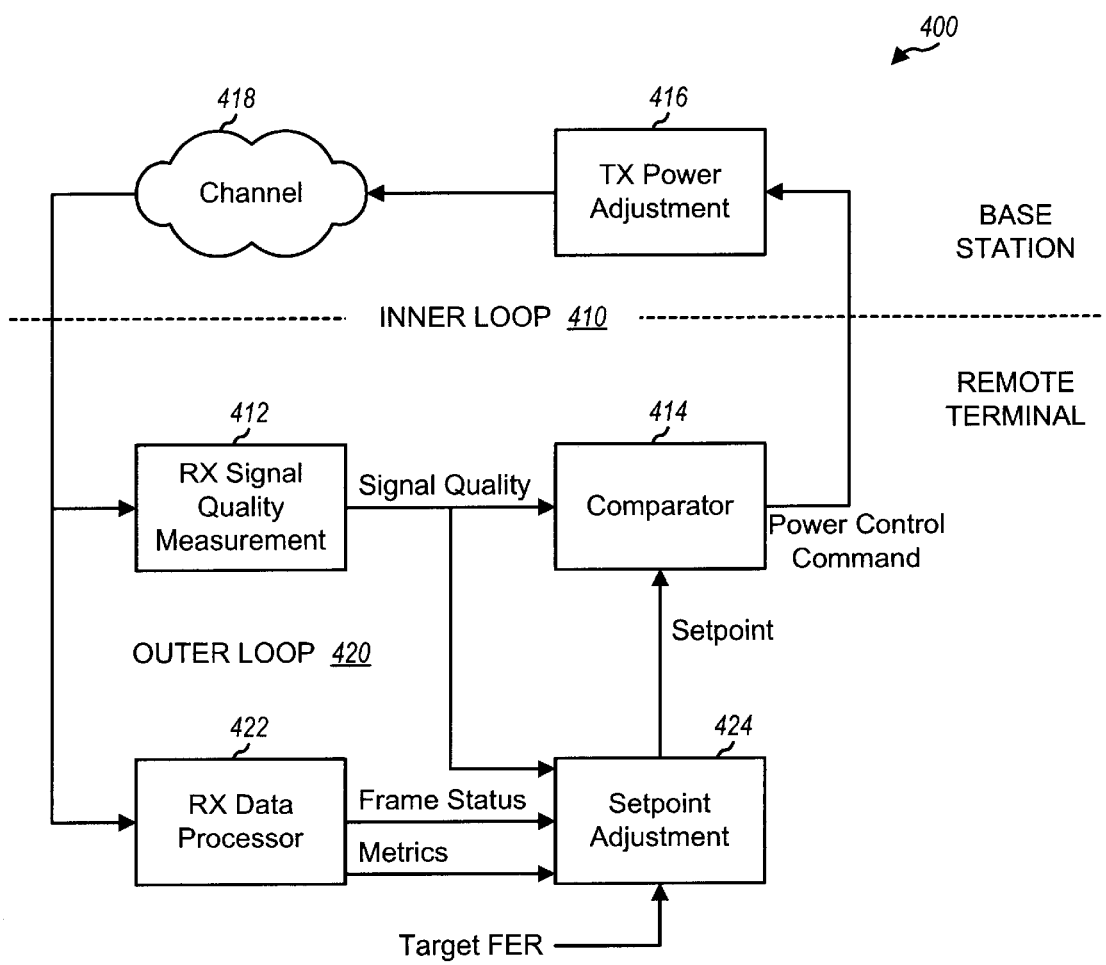
FIG. 4 is a diagram of a forward link power control mechanism capable of implementing certain aspects and embodiments of the invention.

FIG. 4 is a diagram of a forward link power control mechanism 400 capable of implementing certain aspects and embodiments of the invention. Power control mechanism 400 includes an inner loop power control 410 that operates in conjunction with an outer loop power control 420.

Inner loop 410 is a (relatively) fast loop that attempts to maintain the signal quality of a transmission received at the remote terminal as close as possible to a target $E_b/N_t$ (or simply, the setpoint). As shown in FIG. 4, inner loop 410 operates between the remote terminal and base station. The power adjustment for inner loop 410 is typically achieved by measuring the signal quality of a transmission received at the remote terminal (block 412), comparing the received signal quality against the setpoint (block 414), and sending a power control command to the base station.

The power control command directs the base station to adjust its transmit power and may be implemented, for example, as either an "UP" command to direct an increase in the transmit power or a "DOWN" command to direct a decrease in the transmit power. The base station adjusts the transmit power of the transmission accordingly (block 416) each time it receives a power control command. For the cdma2000 system, the power control command may be sent as often as 800 times per second, thus providing a relatively fast response time for inner loop 410.

Due to path loss in the communication channel or link (cloud 418) that typically varies over time, especially for a mobile remote terminal, the received signal quality at the remote terminal continually fluctuates. Inner loop 410 thus attempts to maintain the received signal quality at or near the setpoint in the presence of changes in the communication link.

Outer loop 420 is a (relatively) slower loop that continually adjusts the setpoint such that a particular level of performance is achieved for the transmission to the remote terminal. The desired level of performance is typically a target frame error rate (FER), which is 1% for some CDMA systems, although some other target value may also be used. Moreover, some other performance criteria may also be used instead of the FER (e.g., a quality indicator) to adjust the setpoint.

For outer loop 420, the transmission from the base station is received and processed to recover the transmitted frames, and the status of the received frames is determined (block 422). For each received frame, a determination is made whether the frame was decoded correctly (good) or in error (erased) or not transmitted at all. One or more metrics related to the results of the decoding may also be obtained. Based on the status of the decoded frame (either good, erased, or no transmission), one or more metrics, and/or possibly other factors (described below), the setpoint is adjusted accordingly (block 424). Typically, if a frame is decoded correctly, the received signal quality from the remote terminal is likely to be higher than necessary. The setpoint may then be reduced slightly, which may cause inner loop 410 to reduce the transmit power for the transmission. If a frame is decoded in error, the received signal quality at the remote terminal is likely to be lower than necessary. The setpoint may then be increased, which may cause inner loop 410 to increase the transmit power for the transmission. And if the remote terminal detects that no frame was transmitted, the setpoint is not adjusted, unless other metrics are available to provide information on the potential transmit power level.

On the forward link in a cdma2000 system, transmission on the Forward Power Control Subchannel (F-PCSCH) may be continued while no traffic channel frames are available. This lack of frame is allowed for the Forward Dedicated Control Channel (F-DCCH). However, the F-PCSCH would still be linked to the full rate power level (e.g., the difference between the F-PCSCH and the full rate on the F-DCCH is announced by the base station on overhead messages or handoff direction messages). Since the F-PCSCH is composed of punctured-in bits in 16 different locations throughout a 20 msec frame, those levels may be used to insert an artificial frame with a power profile, to allow the remote terminal to generate the metrics described herein. Applying the soft metrics described herein to the artificial frame with the power profile for the remote terminal can provide improved performance.

The setpoint can be adjusted for each frame period. The frame status and metrics may also be accumulated for N received frames and used to adjust the setpoint every $N^{th}$ frame period, where N can be any integer greater than one. Since inner loop 410 is typically adjusted many times each frame period, inner loop 410 has a faster response time than outer loop 420.

By controlling the manner in which the setpoint is adjusted, different power control characteristics and system performance may be obtained. For example, the target FER may be adjusted by changing the amount of upward adjustment in the setpoint for a bad frame, the amount of downward adjustment for a good frame, the required elapsed time between successive increases in the setpoint, and so on. In an implementation, the target FER (i.e., the long-term FER) can be set as $\Delta D/(\Delta D+\Delta U)$, where $\Delta U$ is the amount of increase in the setpoint for an erased frame, and $\Delta D$ is the amount of decrease in the setpoint for a good frame. The absolute sizes for $\Delta U$ and $\Delta D$ determine the responsiveness of the system to sudden changes in the communication link.

Figure 5:
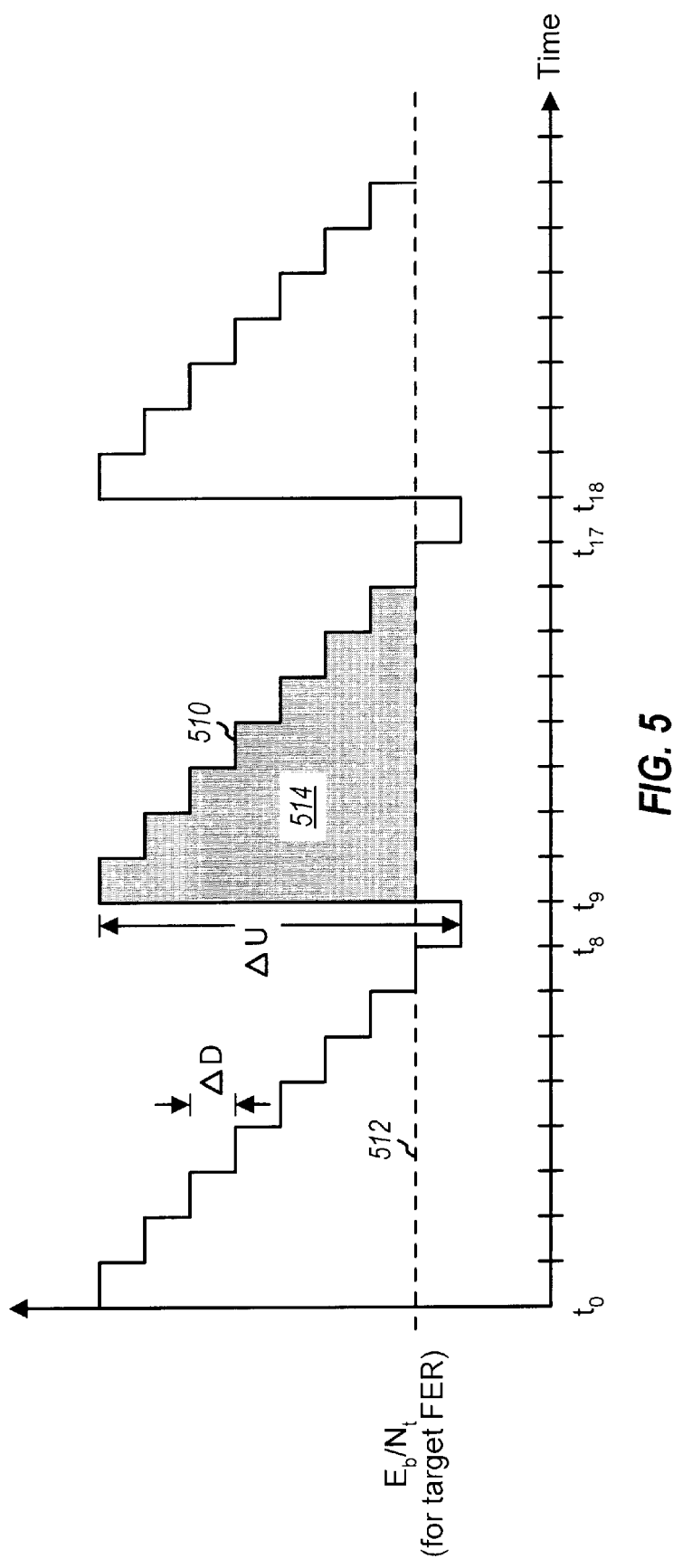
FIG. 5 is a diagram illustrating a setpoint adjustment scheme utilizing a large UP step for an erased frame and a small DOWN step for a good frame.

FIG. 5 is a diagram illustrating a setpoint adjustment scheme whereby the setpoint is increased by a large step for an erased frame and decreased by a small step for a good frame. As shown in FIG. 5, at each of time indices $t_0$ through $t_8$, the received frame is decoded correctly and the setpoint is adjusted downward by $\Delta D$. At time index $t_9$, an erased frame is detected and, in response, the setpoint is adjusted upward by $\Delta U$. Thereafter, at each of time indices $t_{10}$ through $t_{17}$, the received frame is decoded correctly and the setpoint is again adjusted downward by $\Delta D$. And at time index $t_{18}$, an erased frame is detected and the setpoint is adjusted upward by $\Delta U$. The setpoint adjustment continues in similar manner, resulting in a sawtooth response 510 as shown in FIG. 5.

The sawtooth response for the setpoint may result in higher transmit power level than necessary. The threshold $E_b/N_t$ needed to achieve the target FER may be represented by a line 512. To avoid receiving a series of erased frames as link condition worsens, the upward step size, $\Delta U$, is conventionally selected to be large. As a result, the transmit power level is higher than necessary for a large portion of the time when the link condition remains the same, typically starting from the time the setpoint is adjusted upward by $\Delta U$. The shaded area 514 below sawtooth waveform 510 and above line 512 approximately represents excessive transmit power. Since the setpoint can only be decreased in small steps for good frames in the conventional setpoint adjustment scheme, the amount of excessive transmit power (i.e., shaded area 514) can be large. This excessive transmit power is even greater if multiple erased frames are received in close time proximity while the underlying link condition improves afterwards. Moreover, because of the fixed and small downward adjustment steps, the ability to more accurately adjust the setpoint to reflect improving link condition is typically hindered.

In accordance with aspects of the invention, the setpoint is adjusted based on a set of factors that may include the frame status. In one aspect, the setpoint is adjusted based, in part, on one or more metrics obtained for a received and decoded frame. Such metrics may provide information indicative of the "goodness" of the received frame, and not just a hard decision as to whether the frame was good or erased. This information may be used to monitor the link condition and to more accurately adjust the setpoint. The setpoint may be adjusted in different manners and/or by different amounts depending on the determined goodness of the frame, rather than by only two possible values for up and down.

In another aspect, the setpoint may be adjusted based, in part, on the difference between the received signal quality and the setpoint (which is referred to as the power surplus or deficit). This allows the setpoint to be adjusted in a manner to account for the identified responsiveness of the inner loop power control mechanism to changing link condition (i.e., the ability of the inner loop to deliver the required transmit power to achieve the setpoint). In yet another aspect, the setpoint may be adjusted based, in part, on the difference between the setpoint and the threshold $E_b/N_t$ needed for the desired level of performance, e.g., 1% FER, (which is referred to as the setpoint surplus or deficit). These and other aspects of the invention are described in further detail below.

Various metrics may be used to monitor the quality of the communication channel (i.e., the link condition). Generally, one or more metrics may be obtained for any forward error correcting code (FEC) such as a convolutional code, a Turbo code, a block code, and others. A complementary decoder is typically used at the receiver unit for each FEC. Different sets of metrics may be obtained from different types of decoders. Some decoders and their metrics are described in further detail below. Via these various metrics, the receiver unit is able to monitor the quality of the link and more accurately adjust the setpoint (e.g., before a frame is actually erased).

Many CDMA systems employ a convolutional encoder at the transmitter unit. For each frame to be transmitted, the convolutional encoder encodes the data bits in the frame in accordance with a set of polynomial generators to provide a number of coded bits. Each data bit is associated with a set of coded bits (called a code branch), with the actual values for the coded bits being dependent on the adjacent data bits and the polynomial generators. Some of the coded bits may be punctured (i.e., deleted), and unpunctured coded bits are transmitted. A sequence of coded bits or symbols is thus transmitted for a sequence of data bits in the frame.

At the receiver unit, a complementary convolutional decoder is used to decode the received "soft" (multi-bit) symbols corresponding to the transmitted coded bits. Although various types of decoder may be used, a Viterbi decoder is commonly employed for convolutional decoding. Under certain assumptions about the channel noise, the Viterbi decoder performs maximum likelihood decoding of the transmitted coded bits.

Initially, the path metrics for all $2^{K-1}$ states in the trellis are initialized, where K is the constraint length of the convolutional encoder. For each received code branch (which corresponds to a data bit), the branch metrics of all branches entering each state are computed and added to the path metric for that state to generate updated path metrics. The branch metric is indicative of the error (or distance) between the received code branch and the actual code branch, and the path metric is indicative of the confidence in a particular path through the trellis. The best path entering each state (corresponding to the best updated path metric for the state) is selected and stored in a path memory, and the updated path metric corresponding to the selected path is stored as the new path metric for that state. For each frame, the path through the trellis with the best path metric is selected as the sequence of data bits most likely to have resulted in the received symbol sequence.

The theory and operation of the Viterbi decoder is described by A. Viterbi in a paper entitled "Convolutional Codes and Their Performance in Communication Systems," IEEE Transaction on Communication Technology, Volume COM19, No. 5, October 1971, pages 821–835.

Various metrics may be obtained in conjunction with a convolutional decoder to monitor the link condition and for setpoint adjustment. These metrics include (1) re-encoded symbol error rate (SER), (2) re-encoded power metric, (3) "modified" Yamamoto metric, and possibly others.

Referring back to FIG. 3, to determine the re-encoded SER, the decoded data bits in the decoded frame are provided from decoder 328 to a re-encoder 334, which re-encodes the data with the same convolutional encoder used at the transmitter. The coded bits from the re-encoding are then punctured with the same puncturing scheme used at the transmitter(if any) to generate coded bits.

A SER and correlation detector 336 receives the generated coded bits from re-encoder 334 and the received symbols from deinterleaver 326. The generated symbols are then compared, symbol-by-symbol, with the received symbols (which have been transformed to hard-decision or binary values). During the comparison, errors between the generated bits and received symbols are counted. The re-encoded SER is then determined as the number of symbol errors divided by the total number of symbols compared.

The re-encoded SER is related to the total soft symbol errors within the frame, which may be obtained as the total normalized metric of the most likely path through the trellis. During the Viterbi decoding process, at each stage of the trellis, the path metrics for all $2^{K-1}$ states are normalized according to the best path metric. The symbol errors may be obtained by summing the normalization performed on the path metrics throughout the trellis and the final metric in the trellis. Thus, the re-encoded SER may be obtained from the Viterbi decoding process.

The determination of the re-encoded SER is described in further detail in U.S. Pat. No. 5,751,725, entitled "METHOD AND APPARATUS FOR DETERMINING THE RATE OF RECEIVED DATA IN A VARIABLE RATE COMMUNICATION SYSTEM," issued May 12, 1998, assigned to the assignee of the present application and incorporated herein by reference.

A high re-encoded SER is indicative of poor link condition, which may necessitate an increase or a smaller decrease in the setpoint after a successful decoding of a frame. Conversely, a low re-encoded SER is indicative of better link condition, which may allow for a larger decrease in the setpoint after a successful frame decoding. Generally, increasingly higher re-encoded SER corresponds to increasingly worse link condition than that corresponding to the current setpoint.

To determine the re-encoded power metric, the decoded data bits in the decoded frame are first re-encoded by re-encoder 334 with the same convolutional encoder and then punctured with the same puncturing scheme used at the base station. SER and correlation detector 336 then receives the generated coded bits from re-encoder 334 and the received symbols from deinterleaver 326. An inner product is then computed for the vector (i.e., frame) of received soft symbols and the vector of generated coded bits. The inner product is performed by multiplying the two vectors, element-by-element (i.e., bit-by-bit), and accumulating the resultant products of the multiplications. The final accumulated value is the inner product of the two vectors. The inner product can be expressed as follows:

$$Pm(\hat{x}, y) = \sum_{i=1}^{N} (\hat{x}_i \cdot y_i), \quad \text{Eq (1)}$$

where $\hat{x}$ denotes the coded bits in the re-encoded frame, y denotes the received symbols, N is the number of coded bits in the frame, and $Pm(\hat{x},y)$ is the power metric for the received frame. The inner product in equation (1) may be viewed as a correlation between the re-encoded frame and the received frame.

In another embodiment, an inner product of the power of the symbols may also be computed. In this case, each received symbol and each generated coded bit is first squared. The inner product is then performed on the vectors of squared coded bits and squared received symbols.

The determination of the re-encoded power metric is described in further detail in U.S. Pat. No. 6,175,590, entitled "METHOD AND APPARATUS FOR DETERMINING THE RATE OF RECEIVED DATA IN A VARIABLE RATE COMMUNICATION SYSTEM," issued Jan. 16, 2001, assigned to the assignee of the present application and incorporated herein by reference.

The re-encoded power metric incorporates some elements of the re-encoded SER. If the generated coded bit has the same sign as the received symbol (i.e., no symbol error), the resultant product is positive and increases the power metric. Conversely, if the generated coded bit has opposite sign as the received symbol (i.e., a symbol error), the resultant product is negative and decreases the power metric. A received symbol with a larger magnitude increases (or decreases) the power metric by a larger amount than one with a smaller magnitude.

A higher re-encoded power metric is generally indicative of better link condition, which may allow for a larger decrease in the setpoint after a successful frame decoding. Conversely, a higher re-encoded power metric is indicative of poorer link condition, which may necessitate an increase or a smaller decrease in the setpoint after a successful frame decoding. Generally, increasingly higher re-encoded power metric corresponds to increasingly better link condition relative to the current setpoint.

The modified Yamamoto metric is based on the path metrics of the convolutional decoding. The Viterbi decoder maintains the path metric for the best path at each of $2^{K-1}$ states in the trellis. The path with the best path metric for all states is typically selected as the most likely sequence of data bits. The modified Yamamoto metric is indicative of the confidence in the decoded result, and is based on the difference between the selected (best) path through the trellis and the next closest path through the trellis. To derive the conventional Yamamoto metric, the difference between the best and second best path metrics is compared against a threshold value to generate a binary value, which is indicative of whether or not the selected path meets a certain confidence criteria.

The modified Yamamoto metric is also generated based on the path metrics of the selected and next closest paths. However, the modified Yamamoto metric can be a soft value (i.e., a multi-bit value) and includes information indicative of the difference between the best and second best path metrics. In some embodiments, the modified Yamamoto metric may also include a component related to the actual value of the best path metric. If the difference between the two path metrics is large, the modified Yamamoto metric is high and indicative of greater confidence in the selected path being the correct path. Conversely, if the difference between the two path metrics is small, the modified Yamamoto metric is low and indicative of less confidence in the selected path.

Other convolutional decoder metrics may also be obtained and used for link monitoring and setpoint adjustment, and this is within the scope of the invention.

CDMA systems are typically capable of transmitting a frame at one of a number of possible data rates. The selected data rate may be based on a combination of factors, which may include the amount of data to be transmitted, the amount of available transmit power, and so on. If the data rate is not known to the receiver unit a priori, the received frame may be decoded based on a number of rate hypotheses. Techniques for decoding frames with unknown rates are described in the aforementioned U.S. Pat. Nos. 5,751,725 and 6,175,590. The metrics corresponding to the most likely rate hypothesis are then used for link monitoring and setpoint adjustment.

Many CDMA systems also employ a parallel or serial concatenated convolutional encoder (often referred to as a Turbo encoder) at the transmitter unit. For clarity, aspects of the invention are described herein for the parallel concatenated convolutional code, although the concepts can also be applied to the serial concatenated convolutional code. The Turbo encoder employs two constituent encoders operated in parallel and in combination with a code interleaver. Each constituent encoder is typically implemented as a convolutional encoder. The code interleaver shuffles (i.e., interleaves) the information bits in a frame in accordance with a specifically defined interleaving scheme. One constituent encoder encodes the original information bits in the frame to generate a first sequence of parity bits, and the other constituent encoder encodes the shuffled information bits to generate a second sequence of parity bits. Some of the parity bits in the first and second sequences may be punctured (i.e., deleted). The unpunctured information and parity bits are transmitted as coded bits for the frame.

At the receiver unit, a complementary Turbo decoder is used to decode the received soft bits corresponding to the transmitted coded bits. For each Turbo encoded frame, the received soft bits are stored to a buffer. The received information and parity bits for the first encoder are then retrieved from the buffer and decoded based on the first constituent code to provide "extrinsic" information indicative of adjustments in the confidence in the detected values for the received information bits. The extrinsic information from the first decoder is then stored to a storage unit in an interleaved order matching the code interleaving used at the transmitter unit.

The received information and parity bits for the second encoder are then retrieved from the buffer, combined with the corresponding extrinsic information generated by the first decoder and retrieved from the storage unit, and decoded based on the second constituent code to provide extrinsic information indicative of further adjustments in the confidence in the detected values for the received information bits. The extrinsic information from the second decoder is then stored to the storage unit in a deinterleaved order complementary to the code interleaving used at the transmitter unit. The decoding by the first and second decoders is iterated a number of times to yield the final decoded results.

Various metrics may be obtained in conjunction with a Turbo decoder for link monitoring and setpoint adjustment. These metrics include (1) re-encoded SER, (2) re-encoded power metric, (3) the minimum or average (log) likelihood ratio among bits in the decoded frame, (4) the number of iterations before declaring the decoded frame, and possibly others.

The re-encoded SER and re-encoded power metric can be obtained in similar manners as that described above for the convolutional decoder. The decoded bits in the frame can be re-encoded by re-encoder 334, which in this case implements the same Turbo encoder used at the transmitter unit (including the puncturing). The coded bits generated by re-encoder 334 and the received soft bits are compared/processed in similar manner as that described above by SER and correlation detector 336 to generate the re-encoded SER and/or re-encoded power metric.

The Turbo decoder typically computes a log-likelihood ratio (LLR) of each received information and parity bit as follows:

$$LLR(b_m) = \log\left(\frac{P(b_m = 0)}{P(b_m = 1)}\right),$$

where $P(b_m=0)$ and $P(b_m=1)$ are the probabilities of the received bit, $b_m$, being a zero and a one, respectively. The initial probabilities are based on the received soft value for the symbols. Successive probabilities are modified by iterations of decoding as described above. An LLR of zero indicates an equal likelihood of the bit being a zero or a one, a larger positive LLR value indicates greater likelihood of the bit being a zero, and a larger negative LLR value indicates greater likelihood of the bit being a one.

The minimum or average LLR among the bits in the decoded frame (after the final iteration) may be used as a metric. In some applications, a frame may be deemed unacceptable if any one of the decoded bits in the frame is received in error. And in some other applications, errors for a small number of decoded bits in the frame may be acceptable. Thus, depending on the requirement of the application, the worst LLR (i.e., the LLR with the smallest magnitude) or a number of worse LLRs may be used as an indication of the confidence of the decoded frame. An average of a number of worse LLRs may also be used at a metric.

As noted above, Turbo decoding is typically performed for a number of iterations (e.g., 4, 6, 8, 10, or possibly more) before declaring a decoded frame. With each iteration, the confidence in each received information bit increases until it asymptotically reaches a final value. A Turbo decoder may employ checks during the decoding process to terminate the decoding if the LLRs for the bits in the frame exceed a particular threshold value. Alternatively, the decoder may use a built-in error detecting function (e.g., cyclic redundancy check (CRC)) to determine whether decoding has been successful before reaching the maximum allowed iterations. In these cases, the number of decoding iterations performed before declaring the decoded frame may be used as a decoder metric.

Other Turbo decoder metrics may also be obtained and used for link monitoring and setpoint adjustment, and this is within the scope of the invention.

Similar to the convolutional decoder described above, if the data rate of the received frame is not known a priori, the received frame may be decoded based on a number of rate hypotheses, and the metrics corresponding to the most likely rate hypothesis are then used for link monitoring and setpoint adjustment.

A block code may be used to encode the data prior to transmission. Various block codes may be employed such as a Reed-Solomon code and others. For an (n,k) Reed-Solomon code, a block of k data bits is encoded into a block of n coded bits. The (n,k) Reed-Solomon code is capable of correcting up to (n−k)/2 bit errors within the block of n coded bits. Reed-Solomon coding and decoding are described in further detail by S. Lin and D. Costello in "Error Control Coding: Fundamentals and Applications," Prentice Hall, 1985, pages 171–176.

Various metrics may be obtained in conjunction with a block decoder for link monitoring and setpoint adjustment. These metrics include (1) re-encoded SER, (2) re-encoded power metric, and possibly others.

The re-encoded SER and re-encoded power metric can be obtained for a block encoded frame in similar manner as that described above. The decoded bits in the frame can be re-encoded by re-encoder 334, which in this case implements the same block encoder used at the transmitter unit. The coded bits generated by re-encoder 334 and the received symbols are compared/processed by SER and correlation detector 336 in similar manner as that described above to generate the re-encoded SER and/or re-encoded power metric.

The inner power control loop adjusts the transmit power for a transmission from the transmitter unit such that the signal quality at the receiver unit is maintained at the setpoint. Under normal operating conditions, the inner loop is able to deliver the required transmit power needed to maintain the received signal quality at the setpoint.

However, in certain instances, the inner loop may not be able to maintain the received signal quality at the setpoint. For example, if the path loss suddenly worsens, the inner loop may not ramp up fast enough, the transmit power is less than required to compensate for the path loss, the received signal quality is less than the setpoint, and a negative power surplus (i.e., a power deficit) results. A power deficit may also occur if the transmitter unit is unable (or unwilling) to deliver the required transmit power to achieve the target $E_b/N_t$. Conversely, if the path loss suddenly improves, the inner loop may not ramp down fast enough, the transmit power is more than required, the received signal quality is higher than the setpoint, and a power surplus results. The power surplus is thus indicative of the inner loop's ability to deliver what the outer loop specifies.

In accordance with an aspect of the invention, the performance of the inner loop may be monitored to verify whether the inner loop is delivering the target $E_b/N_t$. The power surplus is determined and considered in making the setpoint adjustment. In an embodiment, the power surplus may be computed as the actual $E_b/N_t$ (i.e., the received signal quality) averaged over a particular time interval (e.g., a frame) minus the setpoint. In another embodiment, the power surplus may be estimated based on the cumulative inner loop power control commands. If the UP and DOWN commands result in the same step size (e.g., ±0.5 dB) in transmit power adjustment, the power surplus may be estimated based on the sum of the DOWN commands minus the sum of the UP commands. And if the UP and DOWN commands result in different step sizes, the power surplus may be estimated based on the scaled sum of the DOWN commands minus the scaled sum of the UP commands.

Figure 6A:
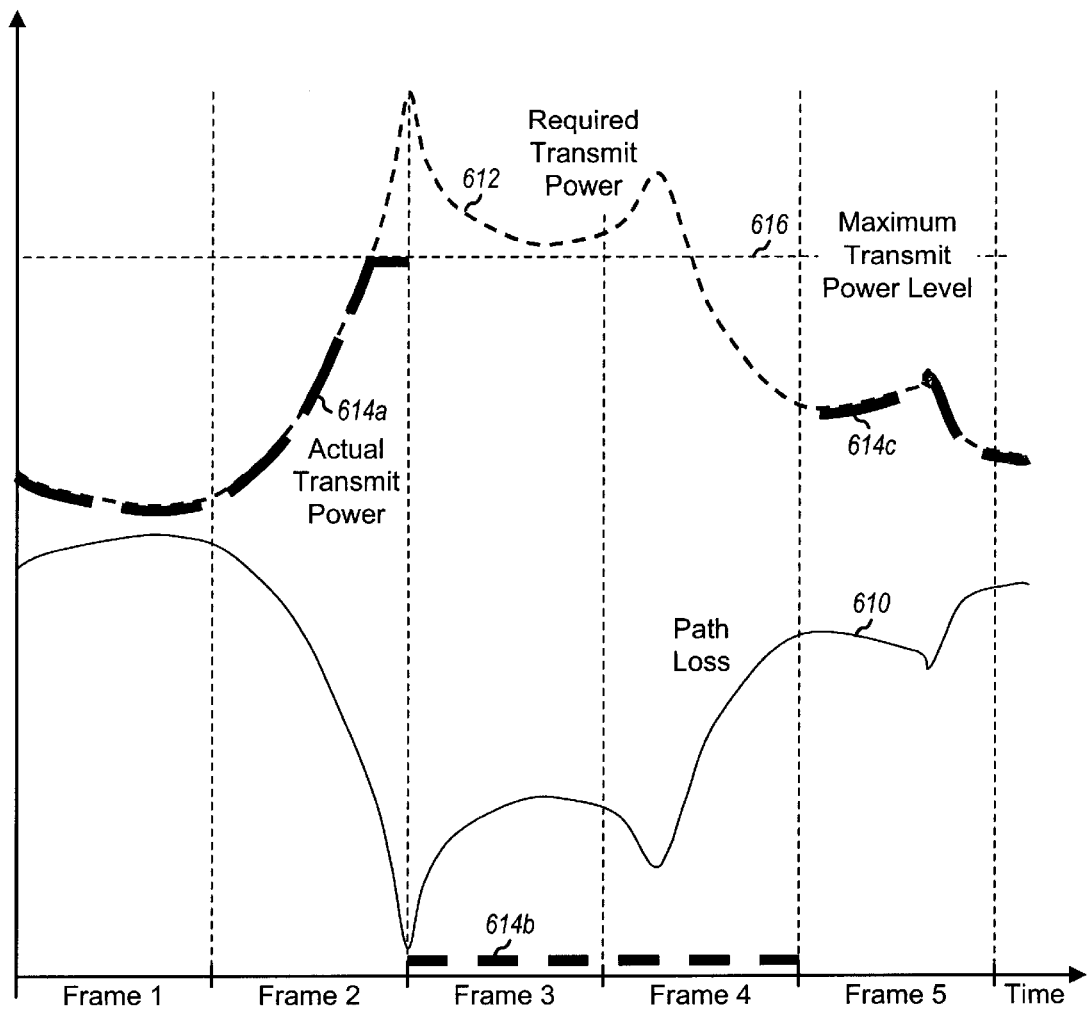
FIGS. 6A and 6B are diagrams illustrating the transmit power and the power surplus, respectively, for an exemplary transmission.

FIG. 6A is a diagram illustrating the transmit power for an exemplary transmission. The actual path loss is represented by a solid line 610, the required transmit power to achieve the target $E_b/N_t$ is represented by a dashed line 612, and the actual transmit power is represented by heavy dashed lines 614a, 614b, and 614c. As shown in FIG. 6A, the transmit power needs to be adjusted in a complementary manner to the path loss to maintain the received signal quality at the setpoint. This is achieved for all of frame 1 and most of frame 2. Toward the last part of frame 2, the path loss worsens by a large amount but the transmit power is limited (i.e., capped) at a particular maximum level designated by a dashed line 616. At the start of frames 3 and 4, the required transmit power is determined to be greater than the maximum level, and transmission is temporarily suspended for these frames. And at frame 5, the required transmit power is determined to be below the maximum level, and transmission is resumed.

Figure 6B:
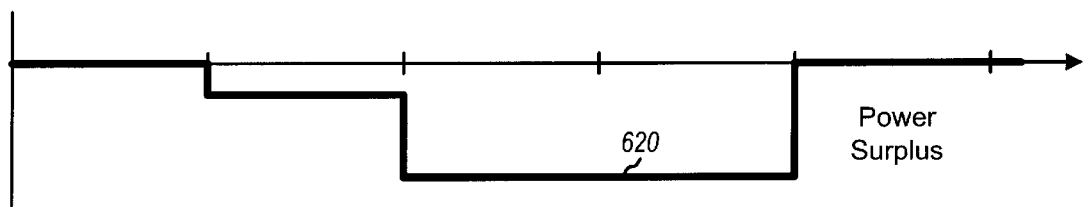

FIG. 6B is a diagram illustrating the power surplus for the transmission as represented by line 620 shown in FIG. 6A. During frame 1, the transmit power is controlled to maintain the received signal quality at the target $E_b/N_t$, and the power surplus is zero. During a portion of frame 2, the transmit power is less than the amount required to achieve the target $E_b/N_t$, the average received signal quality for the frame is less than the target $E_b/N_t$, and a negative power surplus (i.e., a power deficit) results. Since there are no transmissions during frames 3 and 4, the power deficit for these frames is large. And during frame 5, the transmit power is controlled to maintain the received signal quality at the target $E_b/N_t$, and the power surplus is again zero.

Figure 7:
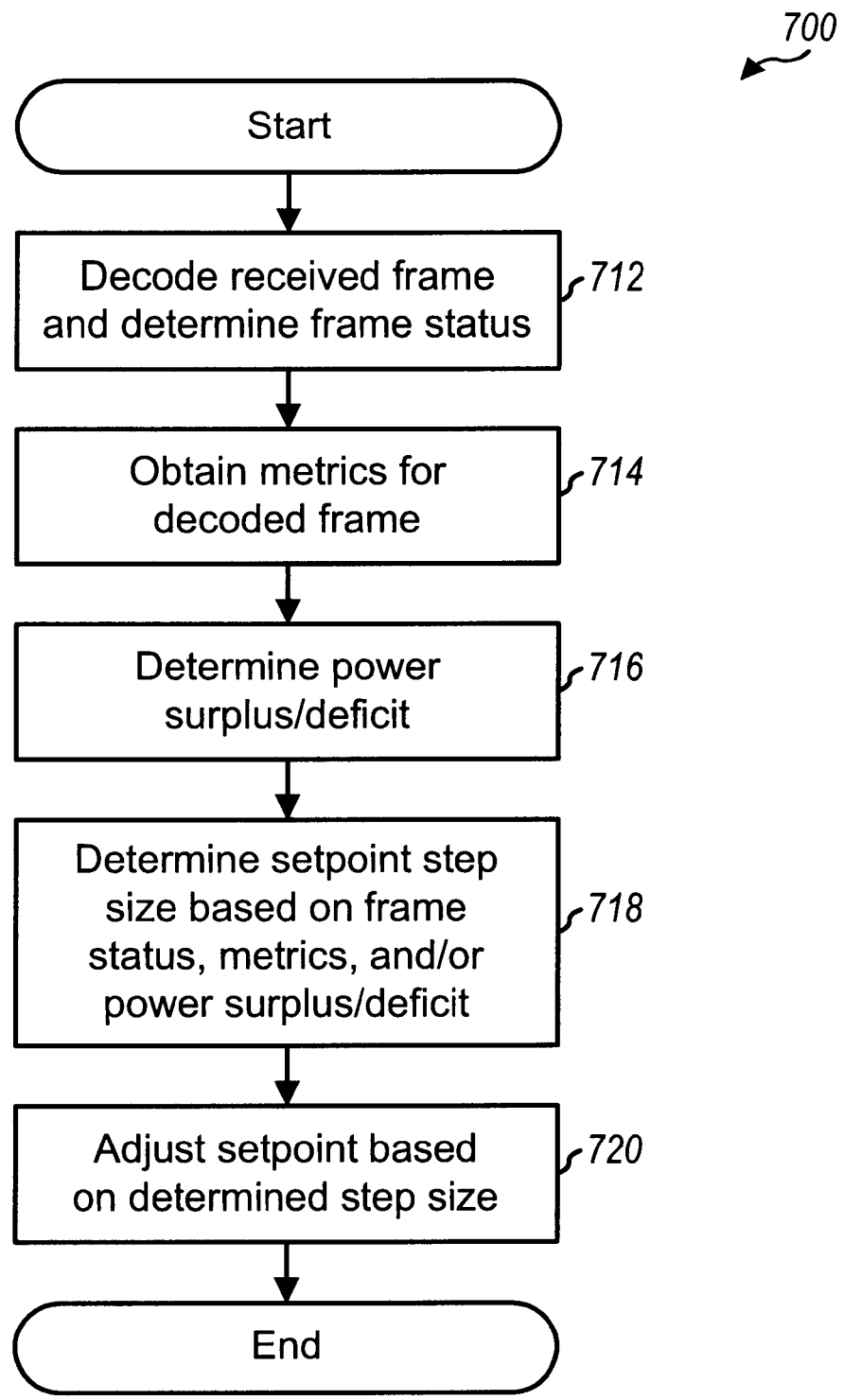
FIG. 7 is a flow diagram of a process for adjusting the setpoint in accordance with an embodiment of the invention.

FIG. 7 is a flow diagram of a process 700 for adjusting the setpoint, in accordance with an embodiment of the invention. Initially, a received frame is decoded and a determination is made as to the status of the decoded frame (i.e., whether the frame is erased or correctly decoded), at step 712. One or more (typically soft) metrics for the decoded frames are then obtained, at step 714. These metrics are dependent on the type of decoding performed on the received frame (e.g., convolutional decoding, Turbo decoding, or block decoding), as described above, and are indicative of the link condition and the confidence in the decoded results. The power surplus or deficit for the inner power control loop is next determined, at step 716. Based on the frame status, metrics, and power surplus/deficit, or a combination thereof, the setpoint step size is determined, at step 718. The setpoint is then adjusted by the determined step size, at step 720.

The metrics are typically correlated with the power surplus described above. The power surplus may thus be taken into account when adjusting the setpoint. For example, the amount of setpoint adjustment may be related to, or based at least in part on, the amount of power surplus or deficit.

In an embodiment, if the power deficit is large (i.e., the inner loop delivers much less power than required to achieve the target $E_b/N_t$) and the received frame is erased, the amount of setpoint adjustment based on the metrics described above may be reduced. The setpoint may be increased by a smaller amount than normal since the inner loop may deliver more power if given time to perform.

In an embodiment, the amount of setpoint adjustment based on the metrics is reduced if the power surplus is positive and the received frame is decoded correctly. The power surplus typically results if the link improves faster than the inner loop can ramp down. The inner loop may deliver less power if given time to perform.

In an embodiment, if the power surplus is near zero (i.e., the inner loop delivers approximately the target $E_b/N_t$), a normal (or possibly increased) amount of setpoint adjustment is made based on the metrics. If the received frame is correctly decoded, the metrics may be used to "fine tune" the setpoint. For example, if the re-encoded SER is low, the re-encoded power metric is high, the modified Yamamoto metric is high, the LLR for the least confident bit is high, or a combination thereof, then the setpoint may be decreased. The amount of downward adjustment may be related to the magnitude of the metrics (i.e., the confidence in the decoded result).

Figure 8A:
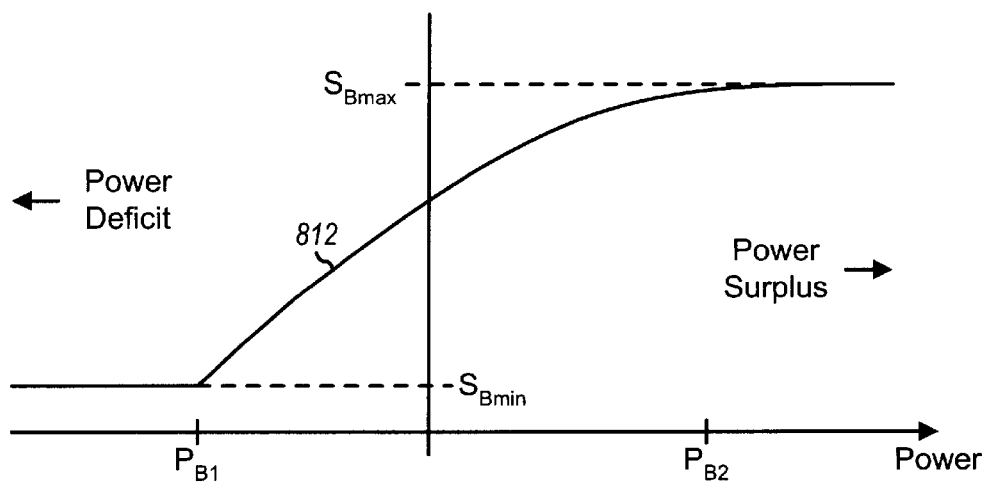
FIGS. 8A and 8B show plots of scaling factors versus power surplus, which may be used for scaling the setpoint step size when a received frame is erased and correctly decoded, respectively.

FIG. 8A shows a plot 812 of a scaling factor, $S_B$, versus power surplus, which may be used for scaling the setpoint step size when a received frame is erased. If there is a power surplus (i.e., the received signal quality is greater than the target $E_b/N_t$) but the received frame still erased, the setpoint may be adjusted by a larger amount. The larger setpoint step size can be obtained via use of a larger scaling factor, as shown in the right half of plot 812. Conversely, if there is a power deficit and the received frame is erased, the setpoint may be adjusted by a smaller amount since the inner loop is anticipated to deliver better received signal quality if given an opportunity to perform. This smaller setpoint step size is obtained via a smaller scaling factor for a power deficit, as shown in the left half of plot 812. Limits are placed in plot 812 to prevent instability. For example, if the power deficit is greater than a threshold level of $P_{B1}$, the scaling factor is maintained at a minimum value of $S_{Bmin}$. And the scaling factor $S_B$ asymptotically reaches a maximum value of $S_{Bmax}$ as the power surplus exceeds a threshold level of $P_{B2}$.

Figure 8B:
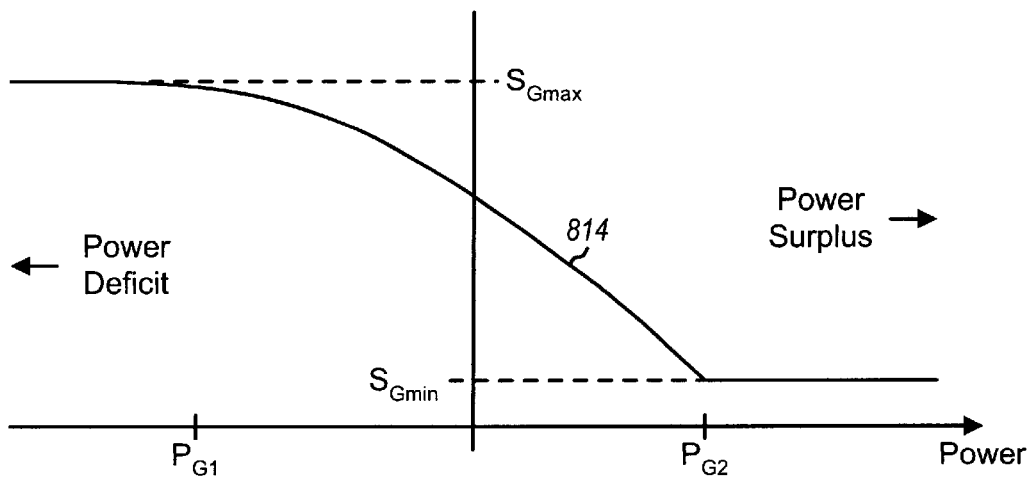

FIG. 8B shows a plot 814 of a scaling factor, $S_G$, versus power surplus, which may be used for scaling the setpoint step size when a frame is correctly decoded. If there is a power deficit (i.e., the received signal quality is less than the target $E_b/N_t$) but a frame is still correctly decoded, the setpoint may be adjusted by a larger amount. The larger setpoint step size can be obtained via a larger scaling factor, as shown in the left half of plot 814. Conversely, if there is a power surplus and the received frame is correctly decoded, the setpoint may be adjusted by a smaller amount since the inner loop is anticipated to lower the received signal quality. The smaller setpoint step size is obtained via a smaller scaling factor for a power surplus, as shown in the right half of plot 814. Again, limits are placed in plot 814 to prevent instability. The scaling factor $S_G$ is maintained at a minimum value of $S_{Gmin}$ even if the power surplus exceeds a threshold level of $P_{G2}$, and asymptotically reaches a maximum value of $S_{Gmax}$ when the power deficit exceeds a threshold level of $P_{B1}$.

Plots with different characteristics than those shown in FIGS. 8A and 8B may also be used for the scaling factors, and this is within the scope of the invention. The plots for the scaling factors may be implemented with look-up tables for some other means.

Any combination of metrics described above, if available at the receiver unit, may be used to monitor the link condition and adjust the setpoint. The setpoint may be adjusted based on any combination of (1) frame erasure information (i.e., frame status), (2) one or more metrics, (3) power surplus/deficit, and (4) setpoint surplus/deficit, as described in further detail below.

In an embodiment, for each metric available for setpoint adjustment, a distribution of metric values for correctly decoded frames is collected for various setpoint settings relative to the threshold $E_b/N_t$ needed for the desired level of performance (e.g., 1% FER). The difference between the setpoint and the threshold $E_b/N_t$ is referred to as the setpoint surplus or deficit (which is different from the power surplus/deficit). The setpoint surplus or deficit is dependent on whether the setpoint is set above (surplus) or below (deficit) the threshold $E_b/N_t$. For each metric, multiple histograms may be collected for different setpoint surpluses/deficits and different link conditions.

Figure 9A:
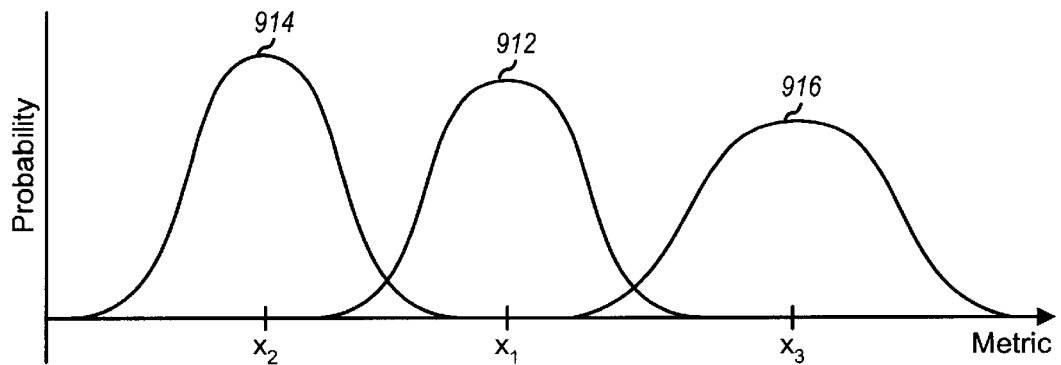
FIG. 9A is a diagram showing histograms for one metric for a number of different setpoint surplus/deficit.

FIG. 9A is a diagram showing histograms for one metric for a number of setpoint surplus/deficit. In this example, histogram 912 shows the distribution of metric values when the setpoint is set at the threshold $E_b/N_t$ (e.g., 6 dB) needed for the desired level of performance (e.g., 1% FER). Histograms 914 and 916 show the distributions of metric values when the setpoint is respectively set below and above the threshold $E_b/N_t$ by a particular amount (e.g., 2 dB, or setpoint=4 dB for histogram 914 and 8 dB for histogram 916). The metric distribution may be collected based on computer simulation, empirical measurements (e.g., in the lab or out in the field), or via some other manner.

Figure 9B:
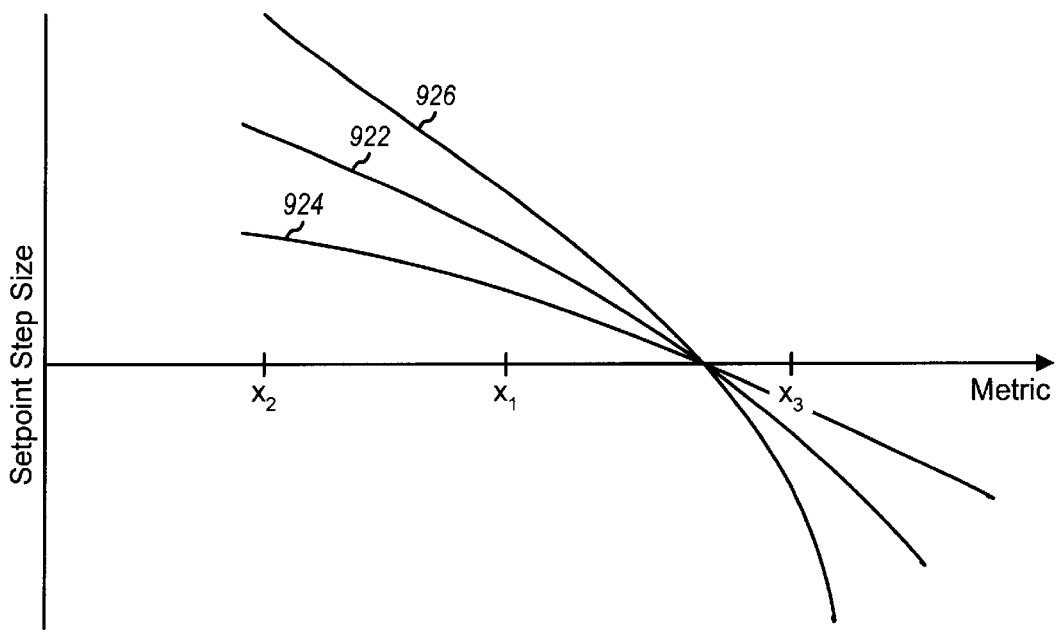
FIG. 9B is a diagram showing plots of the setpoint step sizes for the histograms characterized in FIG. 9A.

FIG. 9B is a diagram showing plots of the setpoint step sizes for the histograms characterized in FIG. 9A. As shown in FIG. 9B, plots 922, 924, and 926 are representative of the setpoint step size for use with histograms 912, 914, and 916, respectively. From these plots, it can be observed that the setpoint step size is dependent on the setpoint surplus/deficit, as represented by different curves and slopes for plots 922, 924, and 926. The setpoint step size is further dependent on the actual metric value, with higher UP step size generally used for low metric confidence and higher DOWN step size generally used for high metric confidence.

FIGS. 9A and 9B show the histograms and setpoint step size plots for a single metric. If multiple metrics are available, similar histograms and plots may be generated for each metric. For a given set of metrics for a received frame, the amount of setpoint adjustment can be determined based on a combination of values from the appropriate plots.

The metrics can be used to monitor the link condition and to adjust the setpoint before a frame is actually erased. If the metrics indicate that the link condition is better than expected (e.g., the re-encoded SER is low, the re-encoded power metric is high, and so on), the target $E_b/N_t$ can be reduced. Conversely, if the metrics indicate that the link condition is worse than expected, the target $E_b/N_t$ can be increased. In an embodiment, the setpoint can be increased even though the frame may have been successfully decoded (which is contrary to conventional mechanisms that decrease the setpoint for all good frames by the same small step, without considering other factors). And if the metrics indicate that the link condition is approximately as expected, the target $E_b/N_t$ can be maintained (i.e., no change).

The setpoint may be adjusted by different amount depending on (1) the frame status, (2) the values of the metrics, (3) the amount of power surplus/deficit, (4) the amount of setpoint surplus/deficit, (5) some other factor, or a combination thereof. If the metrics indicate that the link condition is much better than expected (e.g., a very low re-encoded SER, a very high re-encoded power metric, large magnitude LLRs, and so on), the target $E_b/N_t$ can be reduced by a larger amount. And if the frame is correctly decoded but the decoder metrics indicate less confidence in the result, the target $E_b/N_t$ can be decreased by a smaller amount, maintained, or possibly increased, depending on the actual values of the metrics and the desired power control characteristics.

In an embodiment, the setpoint down step size for a good frame may be obtained as follows:

$$\Delta SP_G = K_1 \cdot C_f \cdot S - K_2, \qquad \text{Eq (2)}$$

where $\Delta SP_G$ is the setpoint step size for a good frame, $K_1$ and $K_2$ are constants selected to achieve a desired power control characteristics, $C_f$ is a confidence factor related to, and obtained from, the available metrics, and S is the scaling factor related to the frame status and power surplus/deficit. $K_1$ and $K_2$ are positive values, and $K_2$ is smaller in magnitude than $K_1$. $K_1$ and $K_2$ may be generated based on histograms for the metrics, such as the ones shown in FIG. 9A.

A similar equation may be defined for the setpoint step size for an erased frame. The same or different $K_1$ and $K_2$ constants and scaling factor S may be used for good frames.

The power control techniques described herein may be used to control the transmit power of multiple traffic channels. In some newer generation CDMA systems (e.g., cdma2000 and W-CDMA systems), to support high-speed data transmission, multiple traffic channels may be concurrently used to transmit larger amount and/or different types of data. These traffic channels may be used to transmit data at different data rates, and may further utilize different processing (e.g., encoding) schemes. Typically, a particular maximum bit rate (e.g., 800 bps) is allocated to each remote terminal for power control of the traffic channels. This allocated bit rate would then be used to transmit messages/commands indicative of the measured signal qualities of the transmissions received on these traffic channels. These messages/commands are then used to provide power control for the traffic channels. Techniques to concurrently power control multiple traffic channels are described in detail in U.S. patent application Ser. No. 09/755,659, entitled "METHOD AND APPARATUS FOR POWER CONTROL OF MULTIPLE CHANNELS IN A WIRELESS COMMUNICATION SYSTEM," filed Jan. 5, 2001, assigned to the assignee of the present application and incorporated herein by reference.

If multiple power control loops are maintained for multiple traffic channels (e.g., a Fundamental Channel and a Supplemental Channel in the cdma2000 system), a "delta" power control mechanism may be used. For this delta power control, the setpoint for a first traffic channel may be adjusted based on various factors as described above, and the setpoint for a second traffic channel may be adjusted relative to that of the first traffic channel. The setpoint for the second traffic channel (e.g., the Supplemental Channel) may be initialized to a nominal delta value relative to the setpoint for the first traffic channel. The transmitter unit then uses a fixed power difference for the two traffic channels. The receiver unit adjusts the setpoint for one or both traffic channels in the manner described herein, and notifies the transmitter unit of the proper power delta to use between the traffic channels. This notification can be performed periodically or a periodically (e.g., when the delta change from the last report value is above a particular threshold).

The power control techniques described herein may also be used for discontinuous transmission. If a channel is not carrying traffic load but has known signal transmitted thereon (e.g., a pilot channel or pilot symbols, such as that used in cdma2000 and W-CDMA systems), the receiver unit can measure the received signal quality over a particular time interval, which may be equal to the time interval for a traffic channel frame. If forward error correction coding is performed, a "virtual" frame may then be formed by scaling various segments of a known codeword by these successive power measurements. If the signal quality is available, then pseudo-random noise samples may be generated and added to the known codeword before it is decoded. The resultant decoder metrics as discussed above may then be used to adjust the setpoint.

For example, if the $E_b/N_t$ for a segment is x dB, then a normalized power of one (1.0) may be used for the signal in that segment and a pseudo-randon number generator may be used to generate a noise sample with variance −x dB. This noise sample is added to the signal with power of one. Each segment of the signal is formed this way with signal and noise reflective of what the link delivered to the receiver. That known frame is then deinterleaved and decoded. Metrics of the decoder are then used to adjust the setpoint, if necessary, in the manner described herein.

The decoder at the receiver unit then decodes the virtual frame and provides various metrics such as erasures, re-encoded SER, re-encoded power metric, modified Yamamoto metric, number of iterations for Turbo decoding, (minimum or average of N worse bits) LLRs for the Turbo decoding, and so on. The setpoint may then be adjusted based on the metrics. If a power control channel exists (e.g., the Forward or Reverse Power Control Subchannel in cdma2000 system) during the silence period on the traffic channel, this channel may be used to estimate the power surplus/deficit that may then be used to further refine the adjustment of the setpoint.

Techniques for performing power control based on pilot reference and discontinuous transmission are described in U.S. patent No. 6,633,522, entitled "METHOD AND APPARATUS FOR DETERMINING THE CLOSED LOOP POWER CONTROL SET POINT IN A WIRELESS PACKET DATA COMMUNICATION SYSTEM," issued Oct. 14, 2003 U.S. patent application Ser. No. 09/755,245, entitled "METHOD AND APPARATUS FOR DETERMINING THE FORWARD LINK CLOSED LOOP POWER CONTROL SET POINT IN A WIRELESS PACKET DATA COMMUNICATION SYSTEM," filed Jan. 5, 2001, and U.S. patent No. 6,373,823 entitled "METHOD AND APPARATUS FOR CONTROLLING TRANSMISSION POWER IN A POTENTIALLY TRANSMISSION GATED OR CAPPED COMMUNICATION SYSTEM," issued Oct. 16, 2002, all assigned to the assignee of the present application and incorporated herein by reference.

Referring back to FIG. 3, for forward link power control, the samples from demodulator 324 (or possibly from RF receiver unit 322) may be provided to an RX signal quality measurement unit 338 that estimates the quality of the received transmission. The received signal quality can be estimated using various techniques, including those described in U.S. Pat. No. 5,903,554, entitled "METHOD AND APPARATUS FOR MEASURING LINK QUALITY IN A SPREAD SPECTRUM COMMUNICATION SYSTEM," issued May 11, 1999, and U.S. Pat. Nos. 5,056, 109, and 5,265,119, both entitled "METHOD AND APPARATUS FOR CONTROLLING TRANSMISSION POWER IN A CDMA CELLULAR MOBILE TELEPHONE SYSTEM," respectively issued Oct. 8, 1991 and Nov. 23, 1993, all three assigned to the assignee of the present application and incorporated herein by reference.

A power control processor 340 receives and compares the received signal quality against the setpoint for the traffic channel being processed and sends a proper responsive power control command (e.g., UP/DOWN commands, or UP/DOWN commands by X dB, or some other type of commands) on a power control sub-channel via the reverse link to the base station.

Power control processor 340 may also receive the frame status from CRC checker 332 and one or more metrics for each decoded frame such as, for example, the re-encoded SER and re-encoded power metric from detector 336, the modified Yamamoto metric from a Yamamoto detector 330, the LLRs for the worse decoded bit(s) and the number of iterations from decoder 328, or a combination thereof. For each decoded frame, power control processor 340 updates the setpoint based on the frame status, metrics, and/or additional information available to processor 340 (e.g., the power surplus/deficit, the setpoint surplus/deficit).

On the reverse link, data is processed (e.g., formatted, encoded) by a transmit (TX) data processor 342, further processed (e.g., covered, spread) by a modulator (MOD) 344, and conditioned (e.g., converted to analog signals, amplified, filtered, quadrature modulated, and so on) by an RF TX unit 346 to generate a reverse link signal. The power control information from power control processor 340 may be multiplexed with the processed data by TX data processor 342 or modulator 344. The reverse link signal is routed through duplexer 314 and transmitted via antenna 312 to one or more base stations 104.

Referring back to FIG. 2, the reverse link signal is received by antenna 224, routed through duplexer 222, and provided to an RF receiver unit 228. RF receiver unit 228 conditions (e.g., downconverts, filters, and amplifies) the received signal and provides a conditioned reverse link signal for each remote terminal being received. A channel processor 230 receives and processes the conditioned signal for a particular remote terminal to recover the transmitted data and power control information. A power control processor 210 receives the power control information (e.g., any combination of power control commands, erasure indicator bits, and quality indicator bits) and generates one or more signals used to adjust the transmit power of one or more transmissions to the remote terminal.

Back in FIG. 3, power control processor 340 implements part of the inner and outer loops described above in FIG. 4. For the inner loop, power control processor 340 receives the received signal quality measurements and sends a sequence of power control commands, which can be sent via a power control sub-channel on the reverse link. For the outer loop, power control processor 340 receives the frame status and metrics and adjusts the setpoint for the remote terminal accordingly. In FIG. 2, power control processor 210 also implements part of the power control loops described above. Power control processor 210 receives the power control information on the power control sub-channel(s) and accordingly adjusts the transmit power of one or more transmissions to the remote terminal.

The power control techniques can be implemented by various means. For example, the power control can be implemented with hardware, software, or a combination thereof. For a hardware implementation, the elements used for power control can be implemented within one or more application specific integrated circuits (ASICs), digital signal processors (DSPs), programmable logic devices (PLDs), controllers, micro-controllers, microprocessors, other electronic units designed to perform the functions described herein, or a combination thereof.

For a software implementation, the elements used for power control can be implemented with modules (e.g., procedures, functions, and so on) that perform the functions described herein. The software code can be stored in a memory unit and executed by a processor (e.g., power control processor 210 or 340).

For clarity, various aspects, embodiments, and features of the power control of the invention have been specifically described for the forward link. Many of these power control techniques may also be advantageously applied for the reverse link power control. For example, the setpoints for one or more reverse link transmissions may be adjusted based on frame status, one or more metrics, power surplus/deficit, setpoint surplus/deficit, or a combination thereof, as described above.

The foregoing description of the preferred embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. In a wireless communication system, a method for adjusting a power control loop setpoint of a received signal comprising:

decoding one or more received frames in accordance with a particular decoding scheme to provide one or more decoded frames;

obtaining one or more metrics, at least including one of a re-encoded power metric and a modified Yamamoto metric, for the one or more decoded frames; and adjusting the setpoint based at least in part on the one or more metrics.

2. The method of claim 1, wherein each of the one or more metrics is indicative of confidence of the decoded frames based on a respective criteria.

3. The method of claim 1, wherein the re-encoded power metric is indicative of correlation between symbols in a received frame and symbols generated by re-encoding a decoded frame.

4. The method of claim 1, wherein the modified Yamamoto metric is indicative of confidence of the decoded frames based on a selected decoded frame and a next best possible decoded frame.

5. The method of claim 1, wherein the setpoint is increased if the one or more metrics indicate weak confidence of the decoded frames.

6. The method of claim 1, wherein the wireless communication system is a CDMA system that conforms to cdma2000 standard or W-CDMA standard, or both.

7. The method of claim 1, further comprising:

for each decoded frame, determining a power surplus or deficit indicative of the received signal quality for the frame being respectively greater than or less than the setpoint, and wherein the setpoint is adjusted based in part on the determined power surplus or deficit.

8. The method of claim 7, further comprising:

for each decoded frame, determining a step size for adjusting the setpoint based at least in part on the one or more metrics and the power surplus or deficit, and wherein the setpoint is adjusted based on the determined step size.

9. The method of claim 1, further comprising:

determining a setpoint surplus or deficit indicative of a difference between the setpoint and a threshold signal quality needed to achieve a particular level of performance, and wherein the setpoint is adjusted based in part on the determined setpoint surplus or deficit.

10. The method of claim 9, further comprising:

for each decoded frame, determining a step size for adjusting the setpoint based at least in part on the one or more metrics and the setpoint surplus or deficit, and wherein the setpoint is adjusted based on the determined step size.

11. The method of claim 1, further comprising:

for each decoded frame, determining a step size for adjusting the setpoint, and wherein the setpoint is adjusted based on the determined step size.

12. The method of claim 11, wherein the step size is variable and dependent on values for the one or more metrics.

13. The method of claim 11, wherein the step size is determined based at least in part on the confidence of the decoded frames as indicated by the one or more metrics.

14. The method of claim 13, wherein the step size is increased if the one or more metrics indicate strong confidence of the decoded frames.

15. The method of claim 13, wherein the step size is decreased if the one or more metrics indicate weak confidence of the decoded frames.

16. In a wireless communication system, a method for adjusting a power control loop setpoint of a received signal comprising:

decoding one or more received frames in accordance with a particular decoding scheme to provide one or more decoded frames;

obtaining one or more metrics, at least including one of a re-encoded power metric and a modified Yamamoto metric, for the one or more decoded frames;

determining a power surplus or deficit indicative of the received signal being respectively greater than or less than the setpoint; and adjusting the setpoint based at least in part on the one or more metrics and power surplus or deficit.

17. The method of claim 16, wherein the power surplus or deficit is determined for each received frame based on an averaged received signal quality for the frame and the setpoint for the frame.

18. The method of claim 16, further comprising:

for each decoded frame, determining a step size for adjusting the setpoint based at least in part on the determined status and power surplus or deficit, and wherein the setpoint is adjusted based on the determined step size.

19. The method of claim 16, wherein the step size is scaled by a larger scaling factor if a received frame is correctly decoded and a power deficit exists for the frame.

20. The method of claim 16, wherein the step size is scaled by a smaller scaling factor if a received frame is correctly decoded and a power surplus exists for the frame.

21. The method of claim 16, wherein the step size is scaled by a larger scaling factor if a received frame is erased and a power surplus exists for the frame.

22. The method of claim 16, wherein the step size is scaled by a smaller scaling factor if a received frame is erased and a power deficit exists for the frame.

23. A power control unit for use in a wireless communication system, comprising:

a decoder configured to decode received frames in accordance with a particular decoding scheme to provide decoded frames;

a metric calculation unit configured to provide one or more metrics, at least including one of a re-encoded power metric and a modified Yamamoto metric for the one or more decoded frames; and a power control processor configured to receive the one or more metrics for the decoded frames and to adjust a setpoint for a power control loop based at least in part on the one or more metrics, wherein the setpoint is indicative of a target received signal quality for the received frames.

24. The power control unit claim 23, further comprising:

a signal quality measurement unit configured to receive and process symbols for the received frames to provide estimates of the received signal quality for the received frames, and wherein the power control processor is further configured to receive the received signal quality estimates, determine a power surplus or deficit between the received signal quality and the setpoint, and adjust the setpoint based in part on the determined power surplus or deficit.

25. The power control unit claim 23, wherein for each decoded frame the power control processor is configured to adjust the setpoint by a particular amount based in part on values for the one or more metrics.

26. The power control unit claim 23, and operative on a forward link of a CDMA system.

27. The power control unit claim 23, and operative on a reverse link of a CDMA system.

* * * * *